United States Patent [11] 3,620,787

| [72] | Inventor | Robert M. McMarlin<br>Newark, Ohio |
|---|---|---|
| [21] | Appl. No. | 764,617 |
| [22] | Filed | Oct. 2, 1968 |
| [45] | Patented | Nov. 16, 1971 |
| [73] | Assignee | Owens-Corning Fiberglas Corporation |

[54] GLASS COMPOSITION
21 Claims, No Drawings

[52] U.S. Cl. .................................................. 106/287 S,
    106/50, 106/52, 161/70, 161/192
[51] Int. Cl. .......................................................... C03c 3/04,
    C03c 13/00, B32b 17/06
[50] Field of Search ............................................ 106/50, 52

[56] References Cited
UNITED STATES PATENTS

| 1,789,658 | 1/1931 | Meth .............................. | 106/52 |
| 2,978,341 | 4/1961 | Bastian et al. ................. | 106/50 |
| 3,127,277 | 3/1964 | Tiede ............................. | 106/50 |
| 3,183,104 | 5/1965 | Thomas ......................... | 106/50 |

FOREIGN PATENTS

| 196,266 | 5/1967 | U.S.S.R. ......................... | 106/50 |

*Primary Examiner*—James E. Poer
*Assistant Examiner*—M. Bell
*Attorney*—Staelin & Overman ABSTRACT: A glass composition comprising silica, alumina, beryllia, and magnesia and fibers formed therefrom on conventional production equipment, exhibit improved modulus, tensile strength, high-temperature resistance and lower density over formerly available textile filaments, and show particular utility in reinforcement of plastic laminates where high strength-to-weight ratios are desired and imperative.

GLASS COMPOSITION

This invention relates to glass compositions and particularly to glass compositions for forming glass fibers exhibiting four specific properties, high tensile strength, high modulus of elasticity, high temperature resistance and low density.

This combination of physical properties becomes important and is useful in reinforcement of plastic laminates when lightweight, high strength construction is needed. Glass fibers produced from the glass compositions of this invention meet this criteria and find use in the aircraft industry and particularly in reinforced materials used in the construction of missiles, rockets, rocket motor covers, satellites, and other space and deep submergence vehicles and watercraft.

Commercial filament E-glass and S-glass are typical of fibers possessing high tensile strengths which are used as reinforcement for plastic and resin laminated structures. E-glass has a virgin glass fiber tensile strength of 500,000 p.s.i. and a virgin fiber density of 2.54 g./cc. S-glass has a virgin glass fiber tensile strength of 700,000 p.s.i. and a virgin fiber density of 2.49 g./cc. The use of the term "virgin" herein denotes that no sizing or after-treatment has been applied to said fiber.

It is one object of this invention to provide glass compositions that are commercially fiberizable and wherein fibers therefrom have high tensile strength, high modulus, high temperature resistance, and low density.

It is another object of this invention to provide glass compositions comprising $SiO_2$, $Al_2O_3$, MgO and BeO, that are commercially fiberizable wherein fibers therefrom are capable of withstanding high temperatures without materially changing composition or form during their useful life or without substantial loss in properties.

It is a further object to provide a glass composition that has exceptionally good fiberizable characteristics and wherein fibers therefrom possess a highly reactive surface that is readily compatible with protective compositions such as sizes, lubricants, finishes, various after treatments and the like.

Other objects and advantages will be apparent from the following description.

The components of the glass composition are present in the following proportions, expressed in mole percent. The preferred ranges of proportions for each constituent are as follows:

| Oxide | Mole Percent |
|---|---|
| $SiO_2$ | 55.0–82.0 |
| $Al_2O_3$ | 8.0–18.0 |
| BeO | 1.0–25.0 |
| MgO | 1.0–15.0 |

This range of proportions for each constituent was selected only after a detailed study had been undertaken and evaluated for obtaining a glass composition which possessed good fiberizing characteristics, and which fibers therefrom possessed high tensile strength, high modulus, high temperature resistance and low density. Magnesia was found to be the only one of many oxides that contributed to lowering the viscosity and temperature of the glass of this invention, while maintaining good modulus and tensile properties on fibers pulled therefrom.

Glass compositions of the type described, without magnesia, are found to possess a steep viscosity-temperature curve, which on a production basis is not advantageous, because in order to form fibers at a specific viscosity, the range of available temperatures is very small. By adding magnesia to beryllia glasses, the viscosity-temperature curve is flattened, thereby widening the range of temperatures (at forming) for a more economical operation. Magnesia also reduces the tendency of these compositions to separate into two or more phases upon cooling.

The use of beryllia in glasses of the type described yields improved properties in the fibers produced therefrom. Said fibers exhibit high modulus of elasticity and low density.

Glasses of high Young's modulus are obtained when the interstices of a silicate network are filled with ions of high field strength. Beryllium is characterized as such an ion. Previous investigation has shown that such glasses are characterized by a low content of network formers, including silica and alumina. Compared on a cation-for-cation basis, beryllium is one of the most effective ions in raising the Young's modulus.

Below is a comparison of the ionic size and field strength of beryllium, magnesium and calcium:

| Ion | Ionic Size | Field Strength |
|---|---|---|
| Be | 0.31 | 16.7 |
| Mg | 0.65 | 4.5 |
| Ca | 0.99 | 2.0 |

Because beryllium is so small in ionic size and possesses such a high field strength, glass compositions containing this element have enhanced devitrification and phase separation tendencies, but heretofore such tendencies have made fiberization of good quality fibers most difficult. Irrespective of these tendencies, good quality fibers were formed from the inventive compositions by melting said compositions under carefully controlled conditions to obtain homogeneity before fiber forming.

Commercially, one method and apparatus by which the glasses of this invention may be melted under carefully controlled conditions to obtain a homogeneous melt is described in U.S. Pat. No. 3,264,076. Good quality fibers possessing high tensile strength, high modulus, high temperature resistance, and low density were obtained from the homogeneous melt.

Glass fibers formed from glass compositions of this invention are formed into multifilament strands, yarns and roving by conventional methods and woven into fabric form for use alone or in laminated structures.

Glass compositions were prepared and samples tested as indicated in the following examples, wherein the ingredients were proportioned by mole percent. Although specific compositions have been disclosed, variations and modifications can be made within the spirit and scope of the invention.

TABLE I

| | E-glass, Control A | S-glass, Control B | I | II | III | IV | V | VI | VII | VIII |
|---|---|---|---|---|---|---|---|---|---|---|
| $SiO_2$ | | | 67.3 | 65.0 | 60.0 | 70.0 | 80.0 | 70.0 | 70.0 | 68.6 |
| $Al_2O_3$ | | | 12.0 | 17.5 | 17.5 | 15.0 | 10.0 | 15.0 | 15.0 | 12.3 |
| BeO | | | 16.8 | 15.8 | 15.0 | 7.5 | 5.0 | 5.0 | 2.5 | 17.1 |
| MgO | | | 3.9 | 11.7 | 7.5 | 7.5 | 5.0 | 10.0 | 12.5 | 2.0 |
| Virgin fiber density, g./cc. | 2.54 | 2.49 | 2.42 | 2.45 | 2.50 | 2.40 | 2.25 | 2.45 | 2.45 | 2.35 |
| Tensile strength, p.s.i.$\times 10^3$ | 500 | 700 | 700 | 841 | 421 | 614 | 600 | 739 | 510 | 518 |
| Modulus of elasticity, p.s.i.$\times 10^6$ | 10.5 | 12.4 | 14.0 | 13.3 | 15.7 | 11.4 | 11.0 | 12.9 | 12.4 | 13.8 |

The glass compositions were melted from batch and fiberized by passing the molten glass through a plurality of orifices of a precious metal bushing maintained at a temperature of about 2,900° F. to produce fibers of approximately 0.00025–0.00045 inches in diameter. Examination of the data in Table I shows that Examples I–VIII are glass compositions within the range of this invention. Although some of the properties of the glass compositions of these examples do not match the face value properties of Control A and Control B, the overall properties thereof hereinafter described in more detail are superior to those of the latter.

For example, one or two of the properties in question may not match the properties of Control A or Control B, but the third property is far superior to that of the controls. This property that is far superior shows up appreciably when all of the properties are evaluated together.

In glasses of the silica - alumina - beryllia - magnesia type the most important single factor in raising the Young's modulus, while maintaining low density, is the addition of beryllia. It has been determined be previous investigation that only in beryllia glass compositions does the density decrease, whereas other cations, such as calcium and magnesium increase the density of glass compositions. This factor of low density is not a natural, inherent characteristic, since the density of beryllium (1.85 g./cc.) is higher than that of calcium (1.415 g./cc.) and magnesium (1.740 g./cc.) but is dependent upon the role which the beryllium ion plays in the structure.

Because of their low density the glasses of this invention inherently have a specific tensile strength and specific modulus of elasticity greater than that of E-glass and in most examples greater than that of S-glass. One method for relating or defining the specific tensile strength and specific modulus of elasticity is by the following formulae:

1. Specific $TS = TS/\rho$
2. Specific Modulus $= Y/\rho$ wherein $TS$=tensile strength measure in p.s.i.
$Y$=modulus of elasticity, measured in p.s.i.
$\rho$=density, measured in no./in.$^3$ Following is a table showing the specific tensile strengths and specific moduli for E-glass, S-glass and some of the glasses of this invention. Also included in the table is a column showing the product of specific tensile strength and specific modulus.

TABLE II

| Glass | Tensile, p.s.i., $10^3$ | Modulus, p.s.i., $10^6$ | Density, lbs./in.$^3$ | $TS/\rho$ $\times 10^6$ | $Y/\rho$ $\times 10^8$ | $TS/\rho \times Y/\rho \times 10^{14}$ |
|---|---|---|---|---|---|---|
| E-glass (Control A) | 500 | 10.5 | 0.092 | 5.43 | 1.14 | 6.16 |
| S-glass (Control B) | 700 | 12.4 | 0.090 | 7.78 | 1.38 | 10.74 |
| Example: | | | | | | |
| I | 700 | 14.0 | 0.087 | 8.05 | 1.61 | 12.96 |
| II | 841 | 13.3 | 0.089 | 9.45 | 1.49 | 14.08 |
| III | 421 | 15.7 | 0.090 | 4.68 | 1.74 | 8.14 |
| IV | 614 | 11.4 | 0.087 | 7.06 | 1.31 | 9.25 |
| V | 600 | 11.0 | 0.081 | 7.41 | 1.36 | 10.08 |
| VI | 739 | 12.9 | 0.089 | 8.30 | 1.45 | 12.04 |
| VII | 510 | 12.4 | 0.089 | 5.73 | 1.39 | 7.96 |
| VIII | 518 | 13.8 | 0.085 | 6.09 | 1.62 | 9.87 |

In the above table, the ratio of $TS/\rho$ is used to denote the high strength to weight relationship. $Y/\rho$ is used to denote the high bending or flex to weight relationship. The product of $TS/\rho \times Y/\rho$ is used by testing laboratories as another criteria for rating different glass compositions that find use in applications where high strength, high modulus, low density reinforcements are required.

Glass fibers formed from glass compositions of this invention find particular utility in plastic matricies as a reinforcing medium, either in continuous form as strand, yarn, roving, fabric, and woven roving, or in discontinuous form as chopped strand and chopped strand mat.

The glasses of this invention melt readily in existing commercial glass-melting units. Commercial fiber-forming processes comprise the steps of flowing a stream of molten glass from a melting source and attenuating said stream into fibers by mechanically pulling the stream through a plurality of orifices in a "bushing" with a pulling device. As the glass is attenuated, solidification takes place and fine-diameter fibers are produced. Collet winders (U.S. Pat. No. 2,391,870) and pulling wheels (U.S. Pat. No. 2,729,027) are used as devices for mechanically attenuating fibers.

Certain glass compositions are difficult to fiberize because of their rapid devitrification rate at or near the liquidus temperature, i.e. the point at which glass begins to crystallize. The liquidus temperature, for the glasses of this invention is about 2,785° F. Because of their viscosity-liquidus relationship, it has been found desirable to have a viscosity of from 100–300 poises, at the temperature at which the fibers are formed, in order to facilitate continuous formation of fibers. The glass compositions are brought to a temperature sufficiently above the liquidus to insure that devitrification will not occur during the fiber-forming. Heat removal from the glass during the fiber-forming is controlled by the use of cooling devices disposed about the orifices through which the molten glass emits as a stream, see Russell Re. 24,060. The removal of heat by cooling devices is in addition to the rapid-cooling inherently present in fiber-forming processes because of the rapid increase in the surface area to total volume relationship which takes place in the glass as it is fiberized.

Various modifications and variations may be made in this invention within the spirit and scope of the appended claims.

What is claimed is:

1. A fiberizable glass composition consisting essentially of silica, alumina, magnesia and beryllia that yields high strength, high modulus and high temperature resistant fibers, wherein the mole percentages of said glass composition are as follows:

| | |
|---|---|
| $SiO_2$ | 55.0–82.0 |
| $Al_2O_3$ | 8.0–18.0 |
| BeO | 1.0–25.0 |
| MgO | 1.0–15.0 |

2. A glass composition as described in claim 1 wherein the mole percentages of each constituent are as follows:

| | |
|---|---|
| $SiO_2$ | 67.3 |
| $Al_2O_3$ | 12.0 |
| BeO | 16.8 |
| MgO | 3.9 |

3. A glass composition as described in claim 1 wherein the mole percentages of each constituent are as follows:

| | |
|---|---|
| $SiO_2$ | 65.0 |
| $Al_2O_3$ | 17.5 |
| BeO | 15.8 |
| MgO | 11.7 |

4. A glass composition as described in claim 1 wherein the mole percentages of each constituent are as follows:

| | |
|---|---|
| $SiO_2$ | 60.0 |
| $Al_2O_3$ | 17.5 |
| BeO | 15.0 |
| MgO | 7.5 |

5. A glass composition as described in claim 1 wherein the mole percentages of each constituent are as follows:

| | |
|---|---|
| $SiO_2$ | 70.0 |
| $Al_2O_3$ | 15.0 |
| BeO | 7.5 |
| MgO | 7.5 |

6. A glass composition as described in claim 1 wherein the mole percentages of each constituent are as follows:

| | |
|---|---|
| $SiO_2$ | 80.0 |
| $Al_2O_3$ | 10.0 |
| BeO | 5.0 |
| MgO | 5.0 |

7. A glass composition as described in claim 1 wherein the mole percentages of each constituent are as follows:

| | |
|---|---|
| $SiO_2$ | 70.0 |
| $Al_2O_3$ | 15.0 |
| BeO | 5.0 |
| MgO | 10.0 |

8. A glass composition as described in claim 1 wherein the mole percentages of each constituent are as follows:

| | |
|---|---|
| $SiO_2$ | 70.0 |
| $Al_2O_3$ | 15.0 |
| BeO | 2.5 |
| MgO | 12.5 |

9. A glass composition as described in claim 1 wherein the mole percentages of each constituent are as follows:

| | |
|---|---|
| SiO | 68.6 |
| Al O | 12.3 |
| BeO | 17.1 |
| MgO | 2.0 |

10. Glass fibers formed from the glass composition of claim 1.

11. Glass fibers formed from the glass composition of claim 2.

12. Glass fibers formed from the glass composition of claim 3.

13. Glass fibers formed from the glass composition of claim 4.

14. Glass fibers formed from the glass composition of claim 5.

15. Glass fibers formed from the glass composition of claim 6.

16. Glass fibers formed from the glass composition of claim 7.

17. Glass fibers formed from the glass composition of claim 8.

18. Glass fibers formed from the glass composition of claim 9.

19. A multifilament strand of glass fibers formed from a glass composition wherein the range of mole percentages of each constituent consists essentially of:
 a. 55.0–82.0 of SiO ,
 b. 8.0–18.0 of Al O ,
 c. 1.0–25.0 of BeO, and
 d. 1.0–15.0 of MgO.

20. A high temperature resistant fabric made of interwoven yarns, said yarns consisting essentially of glass fibers having high tensile strength, high modulus and low density comprising in mole percentages 55.0–82.0% SiO , 8.0–18.0% Al O , 1.0–25.0% BeO and 1.0–15.0% MgO.

21. A plastic matrix reinforced by glass fibers distributed through the matrix wherein said glass fibers consist essentially of in mole percentages 55.0–82.0% SiO , 8.0–18.0% Al O , 1.0–25.0% BeO and 1.0–15.0% MgO.

* * * * *